United States Patent [19]

Rylatt

[11] Patent Number: 4,990,304

[45] Date of Patent: Feb. 5, 1991

[54] INSTRUMENTATION TUBE FEATURES FOR REDUCTION OF COOLANT FLOW-INDUCED VIBRATION OF FLUX THIMBLE TUBE

[75] Inventor: John A. Rylatt, Columbia, S.C.

[73] Assignee: Westinghouse Electric Corp., Pittsburgh, Pa.

[21] Appl. No.: 302,488

[22] Filed: Jan. 27, 1989

[51] Int. Cl.$^5$ .............................................. G21C 3/32
[52] U.S. Cl. .................................... 376/434; 376/439;
376/254; 376/450; 376/240; 376/242
[58] Field of Search ............... 376/240, 242, 254, 434,
376/439, 450

[56] References Cited

U.S. PATENT DOCUMENTS

| | | | |
|---|---|---|---|
| 4,070,241 | 1/1978 | Pennell | 376/287 |
| 4,708,846 | 11/1987 | Patterson | 376/444 |
| 4,716,004 | 12/1987 | Merkovsky et al. | 376/203 |
| 4,717,529 | 1/1988 | Merkovsky et al. | 376/245 |
| 4,751,039 | 4/1988 | Delevaller et al. | 376/261 |
| 4,778,647 | 10/1988 | Gasparro | 376/347 |
| 4,798,699 | 1/1989 | Cerai | 376/327 |
| 4,820,058 | 4/1989 | Wilson | 376/327 |
| 4,839,135 | 6/1989 | Merkovsky | 376/254 |

FOREIGN PATENT DOCUMENTS

| | | | |
|---|---|---|---|
| 0274937 | 7/1988 | European Pat. Off. | 376/254 |
| 1265882 | 8/1968 | Fed. Rep. of Germany . | |
| 52-64590 | 9/1972 | Japan . | |

*Primary Examiner*—Donald P. Walsh
*Assistant Examiner*—Meena Chelliah

[57] ABSTRACT

A nuclear fuel assembly has mechanical elements which constrain the flux thimble tube within the instrumentation tube to maintain physical contact with the interior surface of the instrumentation tube at a plurality of points staggered on a single-diametral plane and spaced substantially throughout the length of the instrumentation tube. The staggered mechanical elements induce a controlled elastic sinuous deflection of the inner thimble tube. The mechanical elements can take several different forms, for example, dimples or cantilevered spring fingers formed in the wall of the instrumentation tube and projecting radially inwardly therefrom.

15 Claims, 4 Drawing Sheets

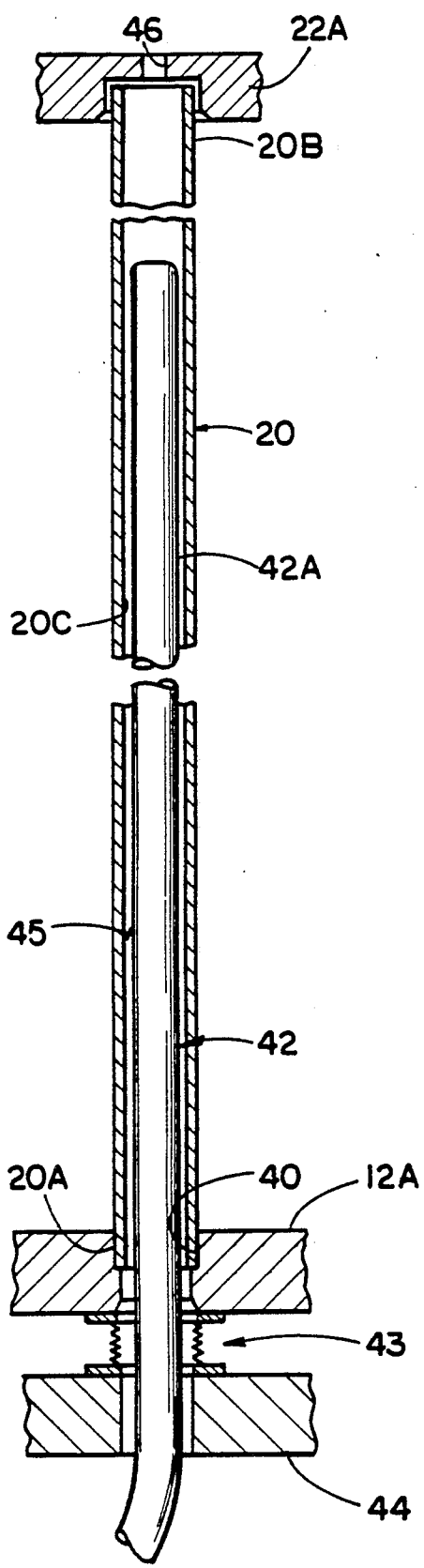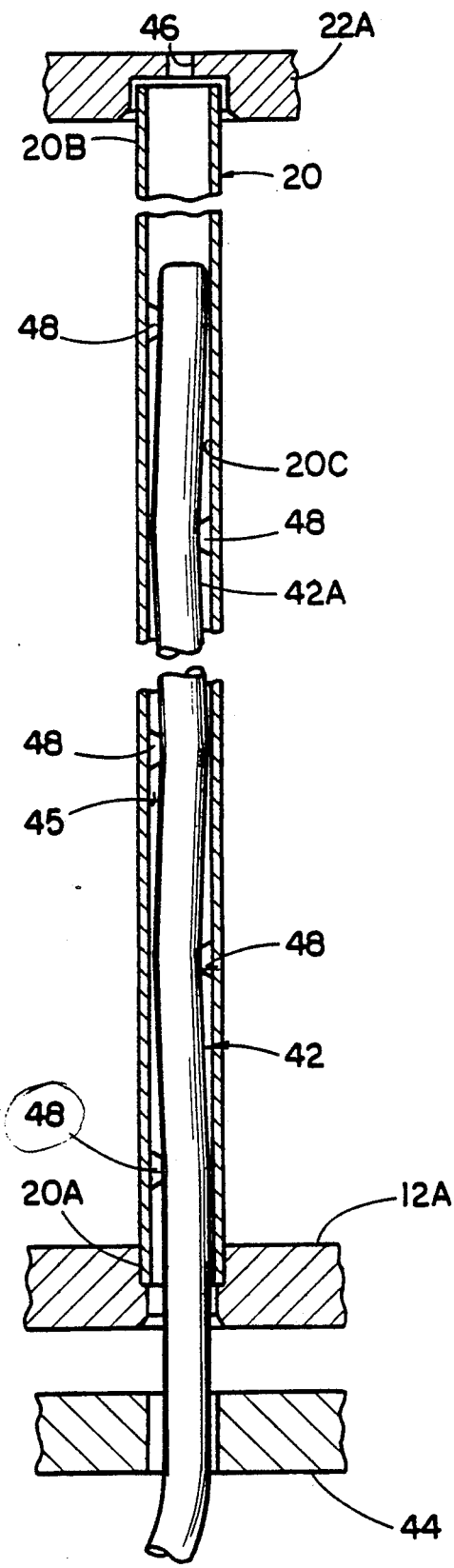
FIG. 2
(PRIOR ART)
FIG. 3

4,990,304

INSTRUMENTATION TUBE FEATURES FOR REDUCTION OF COOLANT FLOW-INDUCED VIBRATION OF FLUX THIMBLE TUBE

BACKGROUND OF THE INVENTION

1. Field of the Invention The present invention relates generally to fuel assemblies for a nuclear reactor and, more particularly, is concerned with instrumentation tube features for reducing coolant flow-induced vibration of a flux thimble tube within the instrumentation tube.

2. Description of the Prior Art

In a typical pressurized water nuclear reactor (PWR), the reactor core includes a large number of fuel assemblies each of which is composed of top and bottom nozzles with a plurality of elongated transversely spaced guide thimbles extending between the nozzles and a plurality of transverse grids axially spaced along the guide thimbles. Also, each fuel assembly is composed of a plurality of elongated fuel elements or rods transversely spaced apart from one another and from the guide thimbles and supported by the grids between the top and bottom nozzles.

The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Further, in each fuel assembly, a provision is made to enable actual flux measurements to be taken under reactor operating conditions. For this purpose a hollow instrumentation tube is located in the approximate center of each fuel assembly and extends between the bottom and top nozzles. The instrumentation tube is open at its bottom end through the adapter plate of the bottom nozzle for insertion of a flux thimble tube into the instrumentation tube. The thimble tube is adapted to take the flux measurements.

Coolant flow passes upward through an annulus formed between the outside diameter of the flux thimble tube and the inside diameter of the instrumentation tube, the coolant entering this annulus from the underside of the bottom nozzle adapter plate. The coolant exits through a bleed orifice formed by the top end of the instrumentation tube and the adapter plate of the top nozzle. The coolant flow induces vibrations in the thimble tube due to the existence of radial clearance and lack of mechanical connection between the instrumentation and thimble tubes. Vibration of the thimble tube frequently results in wall degradation in both the instrumentation tube and the thimble tubes. Instrumentation tube wall degradation, in turn, increases annular coolant flow rate, thereby increasing the jetting of coolant onto surrounding fuel rods. This jetting is known to cause erosion and breakdown of the fuel rod pressure boundary Wear-through of the tubes is presently minimized by placing a coolant flow-limiting seal between the underside of the bottom nozzle adapter plate and a nozzle attached to the core support plate. Although this has been generally successful in preventing wear-through of the tubes, it does not work in all cases. Other proposed solutions are use of small spring devices located at the entrance to the instrumentation tube. However, these devices are subject to coming loose and falling off and thus creating debris in the coolant system.

Consequently, a need exists for an alternative approach to reducing coolant flow-induced vibrations and resultant wear to the instrumentation and thimble tubes.

SUMMARY OF THE INVENTION

The present invention provides vibration reducing features for the instrumentation tube designed to satisfy the aforementioned needs. The present invention is set forth in a fuel assembly having a hollow instrumentation tube and a flux thimble tube inserted in the instrumentation tube for taking flux measurements. The flux thimble tube is radially spaced inwardly at its exterior surface from an interior surface of the instrumentation tube so as to define a coolant flow annulus therebetween. The present invention relates to means for reducing coolant flow-inducing vibration of the thimble tube.

The vibration-reducing means preferably is mechanical elements on the instrumentation tube which constrain the flux thimble tube within the instrumentation tube to maintain physical contact of the exterior of the thimble tube with the interior of the instrumentation tube at a plurality of points. The points are staggered on a single-diametral plane and spaced substantially throughout the length of the instrumentation tube.

The staggered mechanical elements induce a controlled elastic sinuous deflection of the inner thimble tube. The mechanical elements of the present invention can take several different forms, for example, dimples or cantilevered spring fingers formed in the wall of the instrumentation tube and projecting radially inwardly therefrom.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged, longitudinally foreshortened, axial sectional view of a prior art instrumentation tube and inserted flux thimble tube of the prior art fuel assembly of FIG. 1.

FIG. 3 is an enlarged, longitudinally foreshortened, axial sectional view of an instrumentation tube having vibration-reducing features of one configuration in accordance with the present invention.

DETAILED DESCRIPTION OF THE INVENTION

Figure 1:
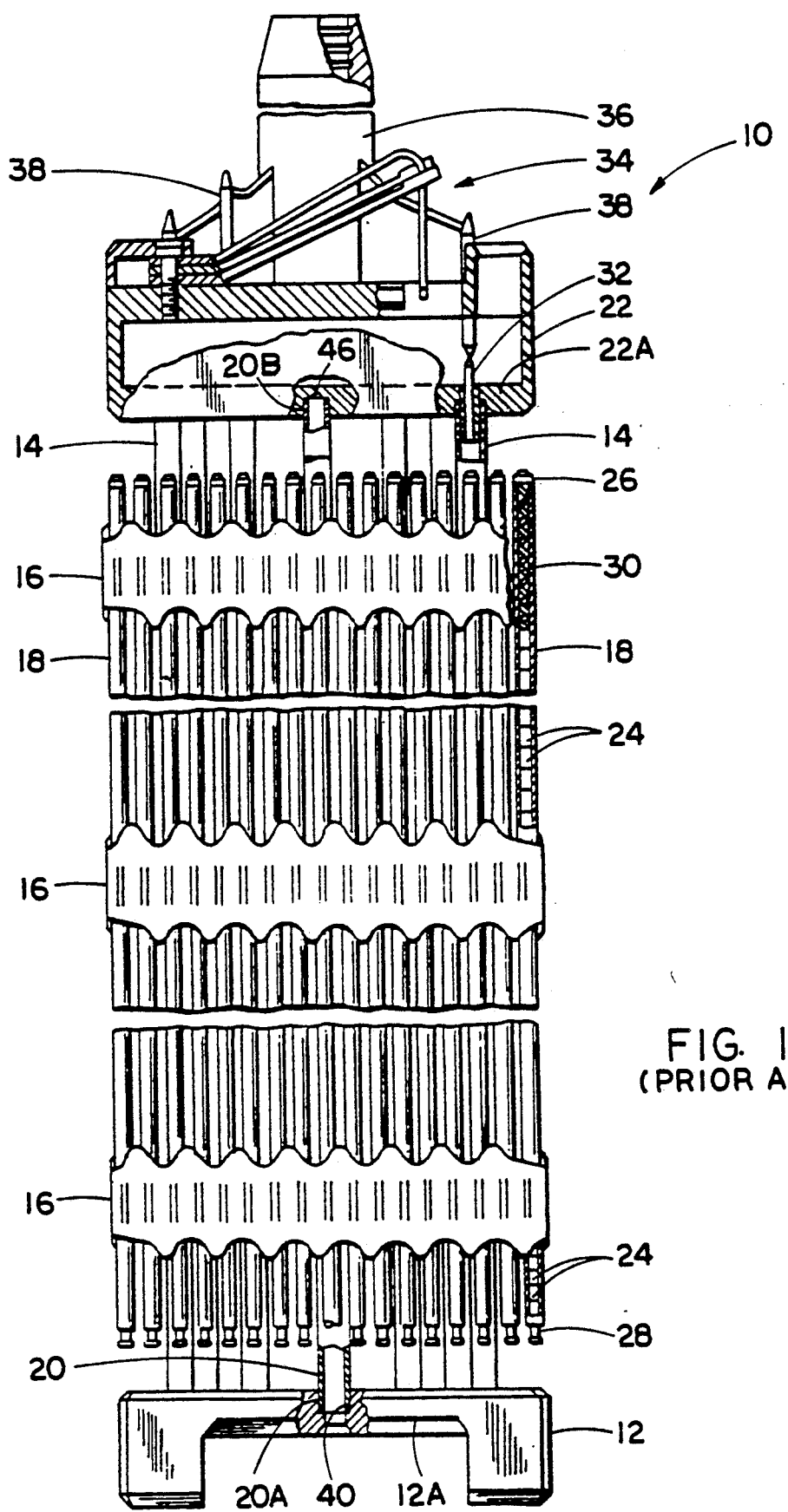
FIG. 1 is an elevational view, partly in section, of a prior art fuel assembly, the assembly being illustrated in vertically foreshortened form with parts broken away for clarity.
Figures 4, 5:
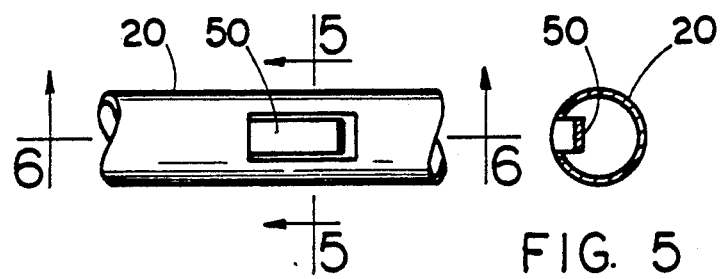
FIG. 4 is an enlarged fragmentary elevational view of an instrumentation tube having vibration-reducing features of another configuration in accordance with the present invention.
FIG. 5 is a cross-sectional view taken along line 5—5 of FIG. 4.
Figure 6:
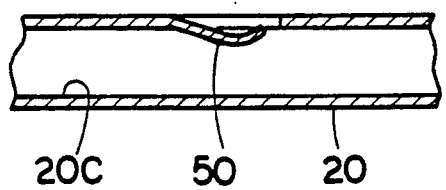
FIG. 6 is a longitudinal sectional view taken along line 6—6 of FIG. 4.
Figure 7:
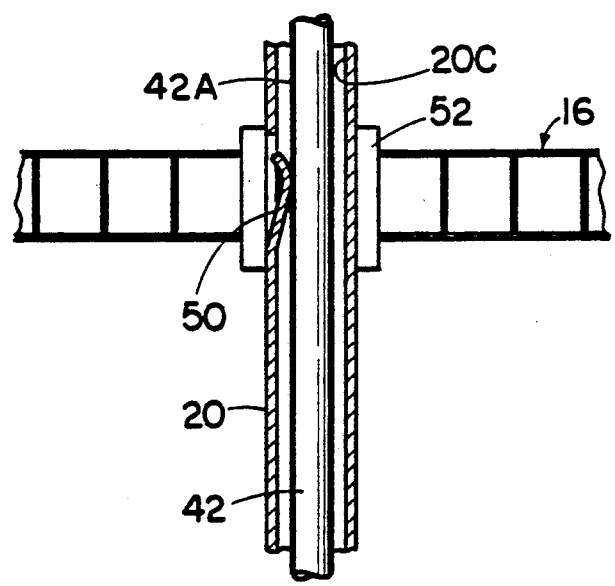
FIG. 7 is an enlarged fragmentary axial sectional view of an instrumentation tube, positioned with a grid, having vibration-reducing features of still another configuration in accordance with the present invention.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically or longitudinally foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Turning also to FIG. 2, the instrumentation tube 20 is provided to enable actual flux measurements to be taken under reactor operating conditions. The instrumentation tube 20 is hollow and located in the center of the fuel assembly 10. Also, the instrumentation tube 20 is seated at its bottom end 20A in a recess 40 in the bottom nozzle 12 and located at its top end 20B within a recess in the top nozzle 22. The instrumentation tube 20 is open at its bottom end 20A through the adapter plate 12A of the bottom nozzle 12. The flux measurements are taken by a flux thimble tube 42. The thimble tube 42 is inserted through a coolant flow-limiting seal device 43 attached and extending between a nozzle 44 on the core support plate (not shown) and the bottom nozzle adapter plate 12A, and therefrom into the instrumentation tube 20 through its open bottom end 20A. The thimble tube 42 runs upwardly through most of the entire length of the instrumentation tube 20.

Coolant flow passes upward through an annulus 45 formed between the exterior surface 42A of the flux thimble tube 42 and the interior surface 20C of the instrumentation tube 20. Coolant enters this annulus 45 from the underside of the bottom nozzle adapter plate 12A. The coolant exits through the top end of the instrumentation tube 20B and through a bleed orifice 46 formed in the adapter plate 22A of the top nozzle 22. Coolant flow-induced vibration of the thimble tube 42 occurs due to the presence of radial clearance and lack of mechanical connection between the instrumentation and thimble tubes 20, 42. Vibration of the flux thimble tube 42 results in wall degradation and eventual perforation.

Vibration-Reducing Features of the Present Invention

Referring now to FIGS. 3-7, the present invention provides vibration reducing features for the instrumentation tube 20 in the form of mechanical elements, for instance as seen in FIG. 3, dimples 48 formed in the tube 20, such as by being bulged from the tube wall, so as to protrude or project radially inwardly toward the axis of the tube. The dimples 48 engage and constrain the flux thimble tube 42 within the instrumentation tube 20 such that it maintains physical contact with the interior surface 20C of the instrumentation tube 20 at the dimples 48 thereon. The dimples 48 are formed at a plurality of points being staggered, such as at 0 degrees and 180 degrees, on a single-diametral plane and spaced substantially throughout the length of the instrumentation tube 20. The dimples 48, preferably staggered on a pitch which is compatible with the fuel assembly grid pitch, induce a controlled elastic sinuous deflection of the thimble tube 42, as seen in FIG. 3. The obstructive configuration of the mechanical elements, i.e., dimples 48, and the sinusoidal thimble tube 42 inhibit coolant flow, however, this is negligible.

The mechanical elements of the present invention can take other suitable forms. For instance, in FIGS. 4-6, the mechanical elements are in the form of cantilevered spring fingers 50 (only one being shown) formed in the instrumentation tube 20, such as by being cut lengthwise from of the instrumentation tube wall to project radially inwardly therefrom similar to the dimples 48. Preferably, in FIG. 7, the spring fingers 50 are located at the elevation of the grids 16. Then, the grid sleeve 52 will cover the hole in the instrumentation tube 20 created by cutting of the spring fingers 50 and hence prevent the jetting of coolant onto adjacent fuel rods 18.

Figure 8:
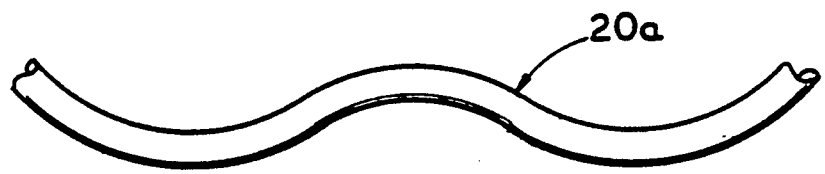
FIGS. 8-10 are elevational longitudinal views, in an enlarged exaggerated form, of three different configurations of an instrumentation tube having vibration-reducing features in accordance with the present invention.
Figure 9:
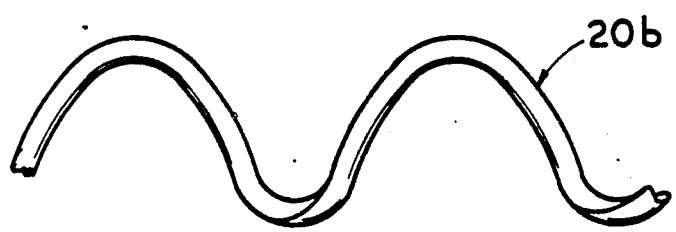
Figure 10:
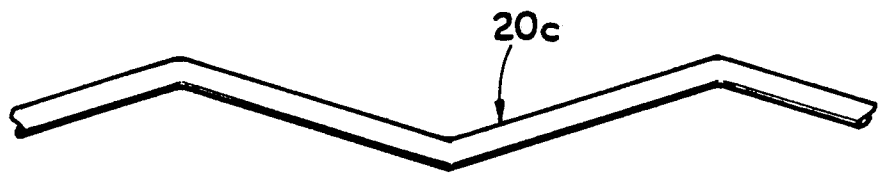

FIGS. 8-10 are longitudinal elevational views, in an enlarged exaggerated form, of instrumentation tubes having vibration-reducing features of still other configurations in accordance with the present invention. In these three embodiments, it's the configuration of the instrumentation tube itself which provides the mechanical elements that engage the flux thimble tube to reduce the aforementioned vibration. In FIG. 8, instrumentation tube 20a has an undulating longitudinal configuration which defines the mechanical elements so as to reduce the vibration of the flux tube when inserted therein. In FIG. 9, instrumentation tube 20b has a spiral configuration which defines the mechanical elements. And in FIG. 10, instrumentation tube 20c has a zig-zag configuration which defines the mechanical elements.

The vibration-reducing features on the instrumentation tube 20 have the following advantages. First, vibration is minimized through the relatively small "beam" span with friction damping. Second, no new components are introduced; only existing parts are modified. Third, there is no impact on interfacing of fuel assembly components. Fourth., there is negligible effect on annular cooling flow rate. Fifth, there is no impact on skeleton design and fabrication. Sixth, there are no highly stressed components as a result of the features. Seventh, design parameters are not as critical for dimples 48 as they are for spring fingers 50, so the dimples are preferred. Eighth, the necessity to use the flow-limiting device 43 may be eliminated. Finally, the features are simple to manufacture and performance reliability is 100%.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a fuel assembly having a instrumentation tube with a hollow interior and a flux thimble tube inserted in said hollow interior of said instrumentation tube for taking flux measurements, said flux thimble tube radially spaced inwardly at its exterior surface from an interior surface of said instrumentation tube so as to define a coolant flow annulus therebetween, means for reducing coolant flow-inducing vibration of said thimble tube, comprising:
   a plurality of mechanical elements defined on said interior surface of said instrumentation tube in said hollow interior of said instrumentation tube at a plurality of axially spaced points therealong for engaging said exterior surface of said flux thimble tube within said instrumentation tube and inducing a controlled elastic sinuous deflection of said thimble tube to reduce vibration thereof induced by coolant flow in said annulus between said instrumentation and thimble tubes.

2. The fuel assembly as recited in claim 1, wherein said mechanical elements are int he form of dimples formed in sad interior surface of said instrumentation tube and projecting radially inwardly therefrom.

3. The fuel assembly as recited in claim 2, wherein said dimples are bulged from a wall of said instrumentation tube.

4. The fuel assembly as recited in claim 1, wherein said mechanical elements are in the form of cantilevered spring fingers formed in said interior surface of said instrumentation tube and projecting radially inwardly therefrom.

5. The fuel assembly as recited in claim 4, wherein said spring fingers are cut out from a wall of said instrumentation tube.

6. The fuel assembly as recited in claim 1, wherein said mechanical elements are formed at a plurality of points on said instrumentation tube interior surface staggered on a single diametral plane through said tube.

7. The fuel assembly as recited in claim 6, wherein said points are at spaced axially and 180 degrees from one to the next.

8. The fuel assembly as recited in claim 1, wherein said mechanical elements are defined by an undulating longitudinal configuration of said instrumentation tube.

9. The fuel assembly as recited in claim 1, wherein said mechanical elements are defined by a spiral configuration of said instrumentation tube.

10. The fuel assembly as recited in claim 1, wherein said mechanical elements are defined by a zig-zag configuration of said instrumentation tube.

11. In a fuel assembly having a skeleton including a plurality of fuel rod-supporting grids being spaced apart from one another along an axis of said skeleton, a instrumentation tube extending through said grids and having a hollow interior, and a flux thimble tue inserted in said hollow interior of said instrumentation tube for taking flux measurements, said flux thimble tube radially spaced inwardly at its exterior surface from an interior surface of said instrumentation tube so as to define a coolant flow annulus therebetween, means for reducing coolant flow-inducing vibration of said thimble tube, comprising:
   a plurality of mechanical elements defined on said interior surface of said instrumentation tube in said hollow interior of said instrumentation tube at a plurality of axially spaced points therealong for engaging said exterior surface of said flux thimble tube within said instrumentation tube and inducing a controlled elastic sinuous deflection of said thimble tube to reduce vibration thereof induced by coolant flow in said annulus between said instrumentation and thimble tubes, said elements being disposed at the elevations of said grids along said instrumentation tube.

12. The fuel assembly as recited in claim 11, wherein said mechanical elements are in the form of spring fingers formed in said interior surface of said instrumentation tube by being cut out lengthwise and projecting radially inwardly therefrom.

13. The fuel assembly as recited in claim 12, wherein said spring fingers by being cut out from said instrumentation tube leave holes in said tube which are substantially covered by said grids.

14. The fuel assembly as recited in claim 11, wherein said mechanical elements are formed at a plurality of points on said instrumentation tube interior surface staggered on a single diametral plane through said tube.

15. The fuel assembly as recited in claim 14, wherein said points are at spaced axially and 180 degrees from one to the next.

* * * * *